Patented Apr. 11, 1944

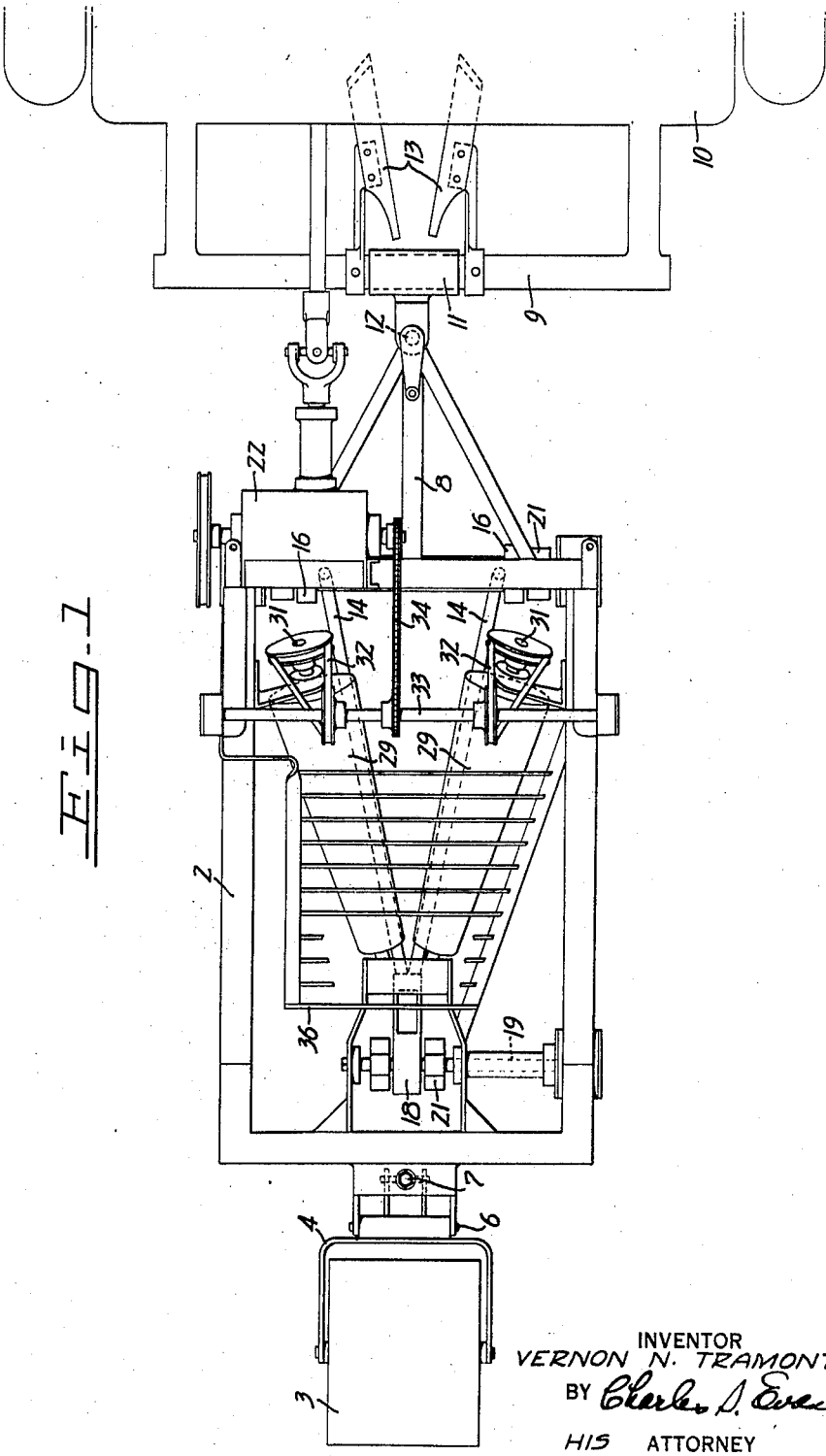

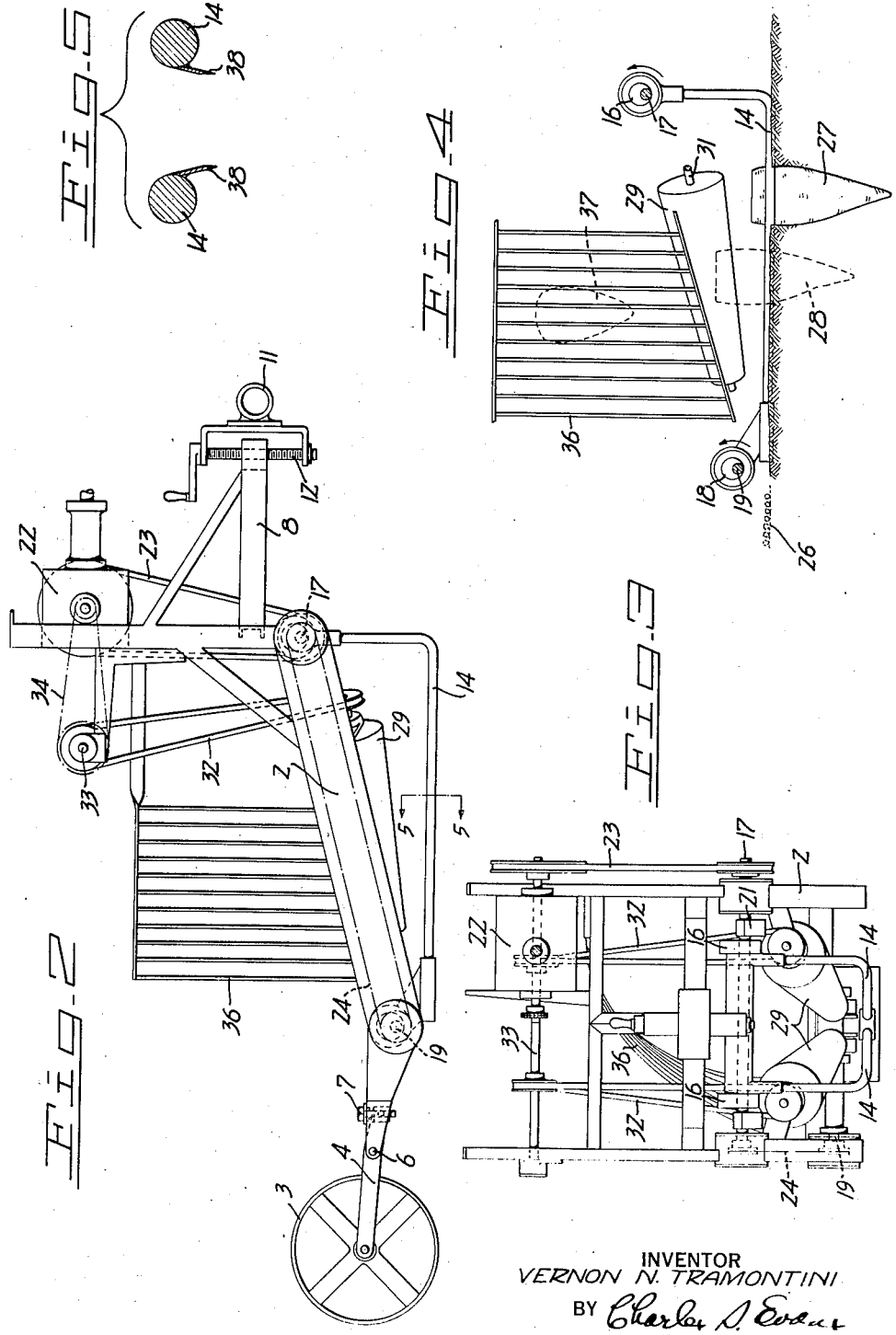

2,346,405

UNITED STATES PATENT OFFICE 2,346,405

BEET HARVESTER

Vernon N. Tramontini, Davis, Calif., assignor to United States Beet Sugar Association, Washington, D. C., a corporation of Utah Application March 8, 1941, Serial No. 382,364

9 Claims. (Cl. 55—106)

My invention relates to a harvester for root crops, such as sugar beets.

It is among the objects of my invention to provide improved means for lifting the beets from the ground.

Another object is to provide lifting means which simultaneously cleans the beets of clods and adhering soil.

A further object is to provide a harvester of the character described adapted to operate in conjunction with an ordinary beet plow.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a plan view of a beet harvester embodying the improvements of my invention; portions of a beet plow being also shown to illustrate the operative relationship.

Figures 2 and 3 are side and front elevational views, respectively, of the harvester.

Figure 4 is a diagrammatic view showing the manner in which a beet is lifted from the ground by my mechanism.

Figure 5 is a detail sectional view taken in a plane indicated by line 5—5 of Figure 2.

In terms of broad inclusion, my harvester for beets and the like comprises a lifting element engageable with a beet, and means for actuating the lifting element to impart a succession of lifting forces to the beet for extracting it from the ground. The lifting element is preferably V-shaped, and is actuated in such manner as to engage successively different diameters of the beet as the latter is elevated. Means are also preferably provided for receiving the lifted beet and discharging it from the machine.

In greater detail, and referring particularly to Figures 1 to 3 of the drawings, my beet harvester comprises a rectangular frame 2 supported at its trailing end by a roller or wheel 3 journaled in a yoke 4 pivoted to the frame by a pin 6. Vertical adjustment of the frame is provided by a screw 7 at the forward end of the pivoted wheel yoke.

The leading end of frame 2 has a tongue 8 connected to a cross bar 9 of a tractor 10 by a hitch 11. A screw 12 on the hitch provides means for adjusting the front end of the frame relative to the ground. The tractor behind which my machine is drawn preferably carries a pair of plow points 13. These points cut along each side of a row of previously topped beets to loosen the soil. Lifting means are provided on frame 2 for extracting the loosened beets. For this purpose a V-shaped lifting element, or fork, comprising a pair of angularly disposed horizontal bars 14, is arranged to lie close to the ground. These bars diverge forwardly to engage the exposed upper edge of a beet in a wedge-like grip, thus insuring engagement with beets of different size.

Means are also provided for actuating or vibrating the lifting element with a combination of horizontal and vertical motions to impart a succession of upward impulses to a beet for extracting it from the ground. The upturned forward ends of bars 14 are connected to a pair of cranks or eccentrics 16 mounted on a cross shaft 17, and the converging rear ends of the bars are connected to a similar crank or eccentric 18 mounted on a shaft 19. These eccentrics preferably have associated weights 21 for purposes of balancing the mechanism. The shafts are driven from a power take-off on the tractor through a transmission 22 and a belt 23 connected with forward shaft 17. A drive chain 24 housed in one side of the frame connects the shafts together and times the eccentrics.

By this crank mounting the lifting element is given a rotary motion (counter-clockwise as viewed in Figure 4) with respect to frame 2; each point on the element describing a small circle about an axis parallel to the shaft axes. When the frame moves, each point on the lifting element traces a cycloidal path with respect to the ground, as indicated by dotted line 26 in Figure 4. Considering that a beet 27 is engaged between the bars of the lifting element, the action is as follows: During a cycle of vibration the element moves forward to grip the beet and move it up a short distance, after which the element moves back and down to grab a new hold on a smaller diameter of the beet. These cycles occur very rapidly and the beet is given a succession of lifting forces or impulses, resulting in the beet being elevated to the position shown by dotted lines 28.

Means are further provided for receiving a lifted beet and discharging it from the machine. To this end a pair of angularly disposed feed rollers 29 are mounted above the lifting element on shafts 31 suitably journaled on the frame. These rollers are preferably of a deformable material, such as rubber, to conform resiliently with the shape of the beets and effect a tight grip. The rollers may be circular in cross-section, as illustrated, or they may have flattened sides to further improve the gripping action. For example, rollers of hexagonal cross-sections may be employed. As shown in Figure 1, the rollers are tapered somewhat toward their rear ends, which together with their angular disposition, provides an angle of divergence substantially equal to that of bars 14. This setting enables the rollers to engage a beet at any point where it happens to be elevated by the V-shaped lifting element.

Rollers 29 are driven by belts 32 from a shaft 33 which in turn is drivably connected with transmission 22 by a chain 34. The peripheral speeds of the rollers are preferably such as to accelerate the beet, thereby getting it out of the way quickly and throwing the beet upwardly with considerable force. A curved grill 36 above the rollers deflects the beet outwardly. The position of a beet tossed upwardly by the rollers is indicated by dotted lines 37 in Figure 4. If desired, a conveyor may be arranged to receive the beets from deflector 36; otherwise the beets are merely tossed out on the ground alongside the machine.

Figure 5 shows blades 38 fastened to the inner surfaces of lifting rods 14. These blades cut into the soil to provide clearance for the rods and thereby reduce the shock of impact against the ground; it being understood that these rods work at substantially ground level to give a low grip on the beets. Blades 38 are preferably set at an angle so as not to cut the beets. Proper setting of rods 14 at ground level in the operative position is effected by adjusting screws 7 and 12. For travel to and from the field the rods are elevated to clear the ground.

An important feature of my machine is that it cleans the beets while lifting them from the ground, and eliminates the need for subsequent agitation, screening and the like commonly employed to remove clods and adhering soil. The beating action of rods 14 against the sides of the beet, plus the squeezing action between rolls 29, effectively removes most of the adhering particles. Root crops, such as sugar beets, have tough outer skins and are not injured by the vibration of rods 14, yet the more friable clods are thoroughly disintegrated and shaken loose.

I claim:

1. A beet harvester comprising a pair of diverging horizontal bars, a vehicle on which the bars are arranged substantially at ground level, means on the vehicle for imparting to the bars rapidly recurring cycles of forward motion to seize the beet in the angle between the bars and upward motion to lift it from the ground, and a blade on each bar to break up the ground below the bar to soften the impact of the bar thereon.

2. A beet harvester comprising a vehicle, a pair of angularly disposed feed rollers arranged on the vehicle, means for rotating the feed rollers, a pair of angularly disposed horizontal bars arranged below the feed rollers at substantially ground level, and means on the vehicle for imparting to the bars rapidly recurring cycles of forward and upward motion for repeatedly seizing and lifting the beet until it is caught by the feed rollers.

3. A beet harvester comprising a vehicle, a pair of substantially horizontal diverging bars arranged on the vehicle adjacent ground level, mechanism including rotatable shaft and cam means for imparting to the bars as a unit rapid cycloidal motion in a vertical direction for repeatedly seizing and lifting each successive beet within the angle between the bars, and feed means for conveying the lifted beet away from the bars.

4. A beet harvester comprising a substantially horizontally supported fork having a V-shaped opening for engaging a beet, and means for imparting to the fork rapidly recurring cycles of motion in which each point on the fork describes a circle in a manner such that the beet is repeatedly seized and lifted.

5. A beet harvester comprising a substantially horizontally supported fork having a V-shaped opening for engaging a beet, means for imparting to the fork rapidly recurring cycles of motion in which each point on the fork describes a circle in a manner such that the beet is repeatedly seized and lifted, and means for removing the lifted beet from the fork.

6. A beet harvester comprising a substantially horizontally supported fork having a V-shaped opening for engaging a beet, means for imparting to the fork rapidly recurring cycles of motion in which each point on the fork describes a circle in a manner such that the beet is repeatedly seized and lifted, and means for seizing the lifted beet from the fork and throwing it upwardly.

7. A beet harvester comprising a substantially horizontally supported fork having a V-shaped opening for engaging a beet, means for imparting to the fork rapidly recurring cycles of motion in which each point on the fork describes a circle in a manner such that the beet is repeatedly seized and lifted, means for seizing the lifted beet from the fork and throwing it upwardly, and a deflector for guiding the beet to one side.

8. A beet harvester comprising a pair of diverging bars forming a V-shaped lifting element, a vehicle supporting said lifting element adjacent and substantially parallel to the ground level for movement along a row of beets for successively engaging the beets within the angle between the bars, and means for vibrating said element through a rapidly recurring cycle of movement including a forward component by which the bars are moved to repeatedly engage each beet at substantially ground level and an upward component by which the beet is lifted upwardly during each period of such engagement.

9. A beet harvester comprising a pair of diverging bars forming a V-shaped lifting element, a vehicle supporting said lifting element adjacent and substantially parallel to the ground level for movement along a row of beets for successively engaging the beets within the angle between the bars, means for vibrating said element through a rapidly recurring cycle of movement including a forward component by which the bars are moved to repeatedly engage each beet at substantially ground level and an upward component by which the beet is lifted upwardly during each period of such engagement, and means for seizing the beets from the lifting element as the beets are lifted and before they are fully removed from the ground.

VERNON N. TRAMONTINI.